United States Patent
Papple et al.

(10) Patent No.: US 10,174,626 B2
(45) Date of Patent: Jan. 8, 2019

(54) PARTIALLY COATED BLADE

(71) Applicant: Pratt & Whitney Canada Corp., Longueuil (CA)

(72) Inventors: Michael Papple, Verdun (CA); Daniel Lecuyer, St-Bruno-de-Montarville (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 989 days.

(21) Appl. No.: 14/514,697

(22) Filed: Oct. 15, 2014

(65) Prior Publication Data

US 2016/0108742 A1    Apr. 21, 2016

(51) Int. Cl.
F01D 5/28 (2006.01)

(52) U.S. Cl.
CPC .......... F01D 5/288 (2013.01); *F05D 2230/90* (2013.01); *F05D 2240/303* (2013.01); *F05D 2240/305* (2013.01); *F05D 2250/292* (2013.01)

(58) Field of Classification Search
CPC ............................. F01D 5/288; F05D 2230/90
See application file for complete search history.

(56) References Cited

U.S. PATENT DOCUMENTS

| | | | |
|---|---|---|---|
| 6,095,755 A * | 8/2000 | Houston | F01D 5/288 416/224 |
| 6,106,231 A | 8/2000 | Brainch et al. | |
| 6,364,608 B1 | 4/2002 | Brainch et al. | |
| 6,383,570 B1 | 5/2002 | Bose et al. | |
| 7,491,033 B2 * | 2/2009 | Trishkin | F01D 5/18 29/889.721 |
| 9,719,371 B2 * | 8/2017 | Hannam | F01D 5/288 |
| 2007/0281088 A1 * | 12/2007 | Rutz | B23P 6/002 427/250 |
| 2010/0143110 A1 * | 6/2010 | Uihlein | C23C 30/00 415/208.1 |
| 2011/0020548 A1 | 1/2011 | Eichmann et al. | |
| 2011/0052406 A1 | 3/2011 | Bruce et al. | |

(Continued)

OTHER PUBLICATIONS

Robert A. Miller, Emphasizing NASA's Role from 1942 to 1990, History of Thermal Barrier Coatings for Gas Turbine Engines, Mar. 2009, p. 21, Glenn Research Center, Ohio.

(Continued)

*Primary Examiner* — Justin Seabe
(74) *Attorney, Agent, or Firm* — Norton Rose Fulbright Canada LLP (57) ABSTRACT

A partially coated blade for a gas turbine engine, including a fillet surface surrounding the airfoil section and connecting it to the platform section. A radially outermost portion of the pressure side and leading edge is covered by a thermal barrier coating. This portion extends radially from a first limit to the blade tip. The first limit is located at a radial distance from the platform of at most 21% of the maximum span. The fillet surface is free or substantially free of the thermal barrier coating. In another embodiment, a second portion of the pressure side and of the leading edge is free or substantially free of the thermal barrier coating, extending radially from the platform section to a second limit located a radial distance from the platform section corresponding to at least 5% of the maximum span. A method of applying a thermal barrier coating is also discussed.

18 Claims, 6 Drawing Sheets

(56) References Cited

U.S. PATENT DOCUMENTS

2014/0030497 A1 1/2014 Tryon et al.
2014/0220324 A1* 8/2014 Strock ................. F02C 7/24
                                                        428/212

OTHER PUBLICATIONS

Peters Et Al, EB-PVD Thermal Barrier Coatings for Aeroengines and Gas Turbines, Advances Engineering Materials, 2001, p. 193 to p. 204, No. 4.

* cited by examiner

FIG. 4

PARTIALLY COATED BLADE

TECHNICAL FIELD

The application relates generally to thermal barrier coatings and, more particularly, to the application of thermal barrier coating to a blade of a gas turbine engine.

BACKGROUND OF THE ART

It is generally known to provide thermal barrier coating on airfoils of a gas turbine engine, to protect the airfoils from relatively high temperature oxidizing and corrosive conditions during use. However, the addition of a thermal barrier coating to an airfoil surface increases the weight of the airfoil. Various configurations of partial coatings, or application of the thermal barrier coating to only some parts of the blade, have been tried to attempt to optimise the balance between the benefits of the application of the coating and the disadvantages caused by the presence of the coating.

SUMMARY

In one aspect, there is provided a partially coated blade for a gas turbine engine, the blade comprising: a platform section; an airfoil section extending radially outwardly from the platform section and defining a tip of the blade, a maximum radial distance between the platform section and the tip defining a maximum span of the blade, the airfoil section including: opposed leading and trailing edges, a pressure side extending from the platform section to the tip and interconnecting the leading and trailing edges, and a suction side from the platform section to the tip and interconnecting the leading and trailing edges opposite the pressure side; wherein a first portion of the pressure side and of the leading edge is covered by a thermal barrier coating, the first portion extending radially between a first limit and the tip, the first limit located at a radial distance from the platform section of at most 21% of the maximum span; and wherein a second portion of the pressure side and of the leading edge is free or substantially free of the thermal barrier coating, the second portion extending radially between the platform section and a second limit, the second limit located at a radial distance from the platform section corresponding to at least 5% of the maximum span.

In another aspect, there is provided a partially coated blade for a gas turbine engine, the blade comprising: a platform section; an airfoil section extending radially outwardly from the platform section and defining a tip of the blade, the airfoil section having: opposed leading and trailing edges, a pressure side interconnecting the leading and trailing edges, and a suction side interconnecting the leading and trailing edges opposite the pressure side; a rounded fillet surface surrounding the airfoil section and connecting the leading edge, trailing edge, pressure side and suction side to the platform section, the fillet surface extending radially from an outer end tangential to the airfoil section to an inner end tangential to the platform section; wherein a radially outermost portion of the pressure side and of the leading edge is covered by a thermal barrier coating, the radially outermost portion extending radially between a first limit and the tip, the first limit located at a radial distance from the platform section of at most 21% of the maximum span; and wherein the fillet surface is free or substantially free of the thermal barrier coating.

In a further aspect, there is provided a method of applying a thermal barrier coating on a blade, the method comprising: masking at least a fillet surface defining a connection between a platform section and an airfoil section of the blade; and applying the thermal barrier coating on at least on a portion of a pressure side and of a leading edge of the blade, the portion extending radially between a limit and a tip of the blade, the limit located at a radial distance from the platform section of at most 21% of a maximum span of the blade.

DESCRIPTION OF THE DRAWINGS

Reference is now made to the accompanying figures in which.

DETAILED DESCRIPTION

Figure 1:
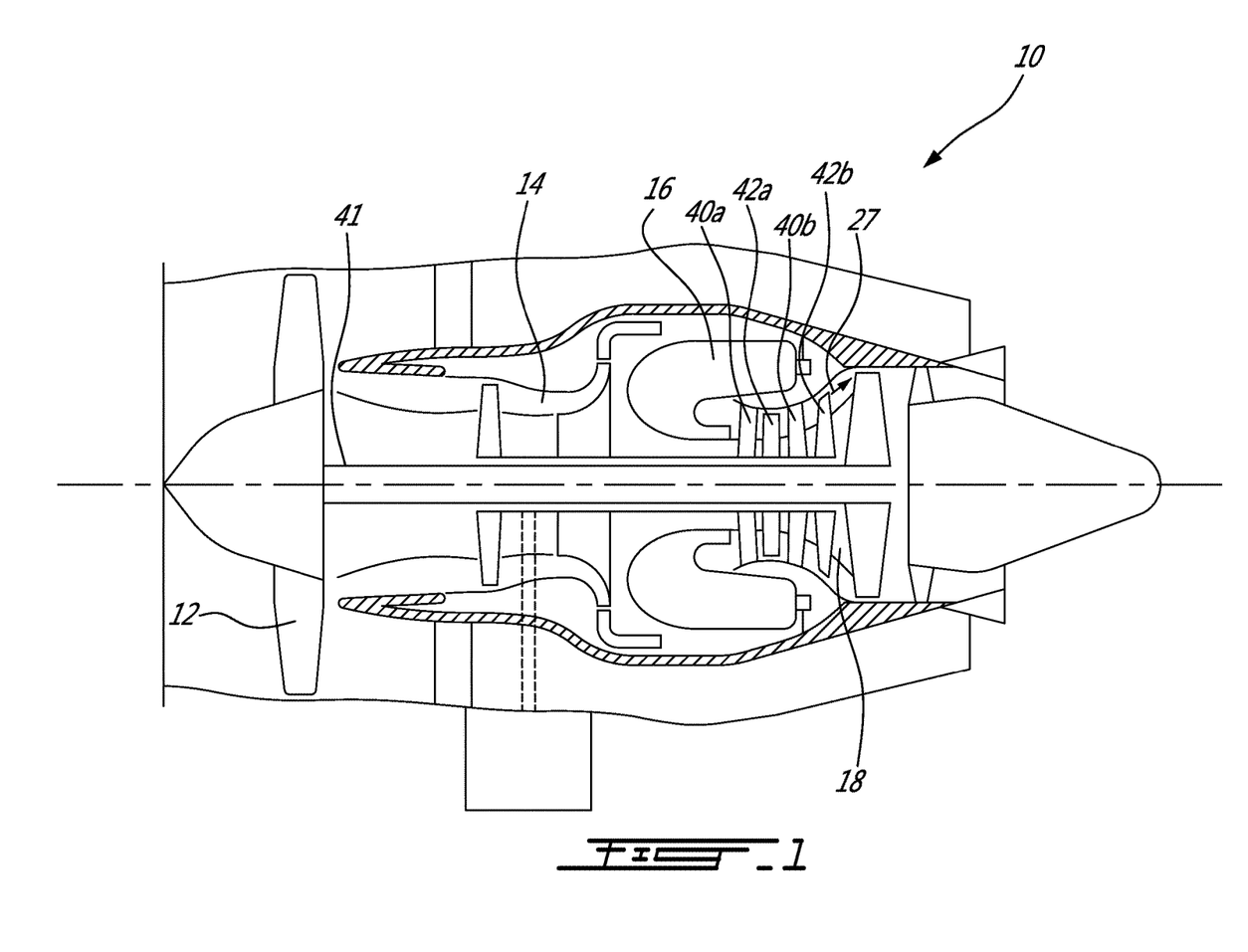
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
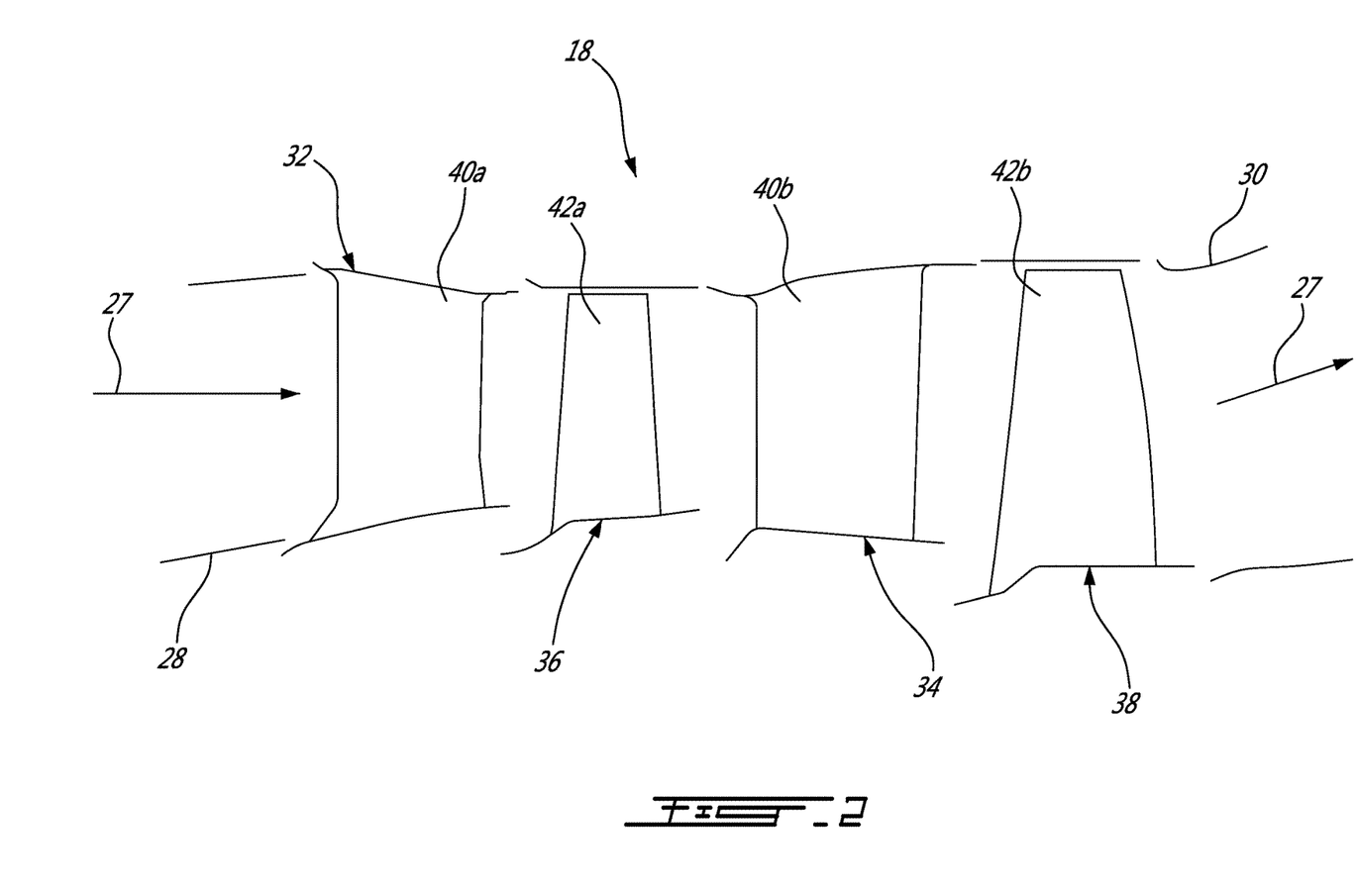
FIG. 2 is a schematic view of a gas path of a gas turbine engine such as shown in FIG. 1, including a two-stage high pressure turbine.

FIG. 2 illustrates a portion of an annular hot gas path, indicated by arrows 27 and defined by annular inner and outer walls 28 and 30 respectively, for directing the stream of hot combustion gases axially in an annular flow.

The turbine section 18 has two high pressure turbine (HPT) stages located in the gas path 27 downstream of the combustor 16. The HPT stages each comprise a stator assembly 32, 34 and a rotor assembly 36, 38 having a plurality of circumferentially arranged vane 40a, 40b and blades 42a, 42b respectively.

Figure 3:
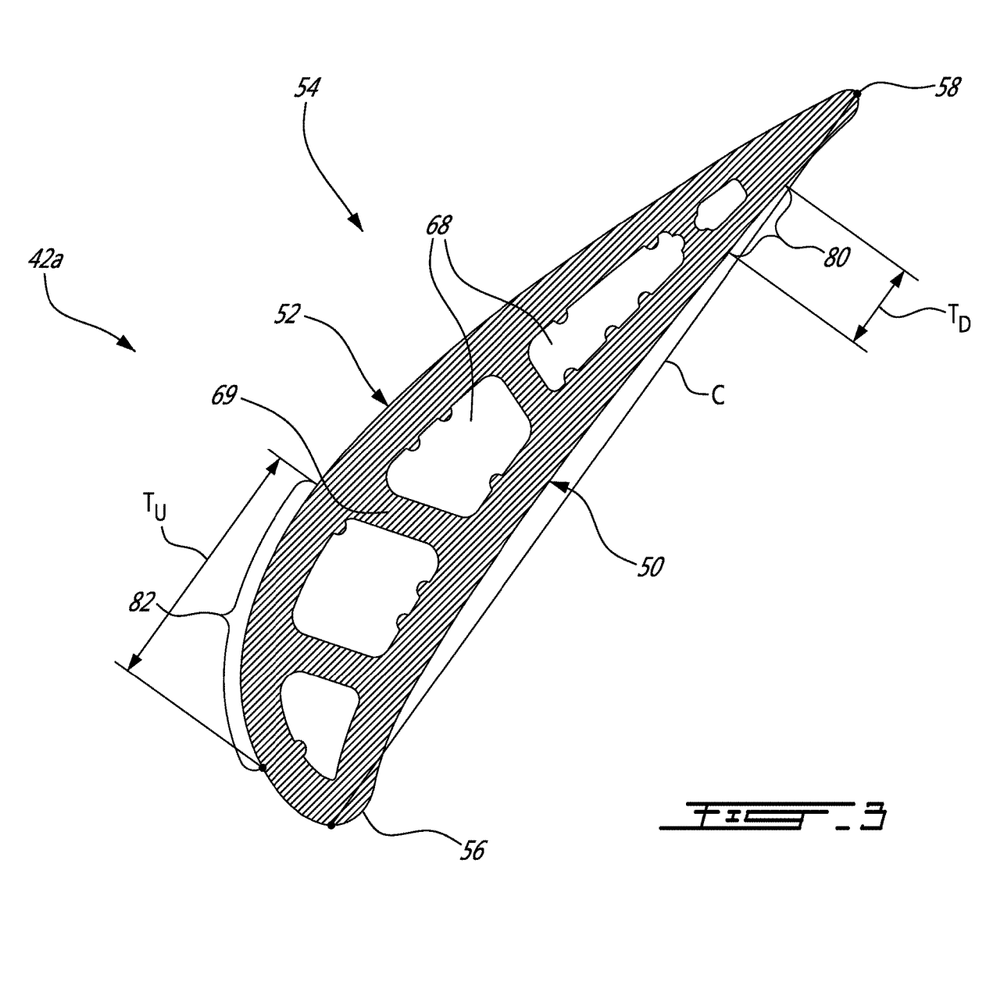
FIG. 3 is a schematic cross-sectional view of a HPT stage blade of a high pressure turbine such as shown in FIG. 2, in accordance with a particular embodiment.
Figure 4:
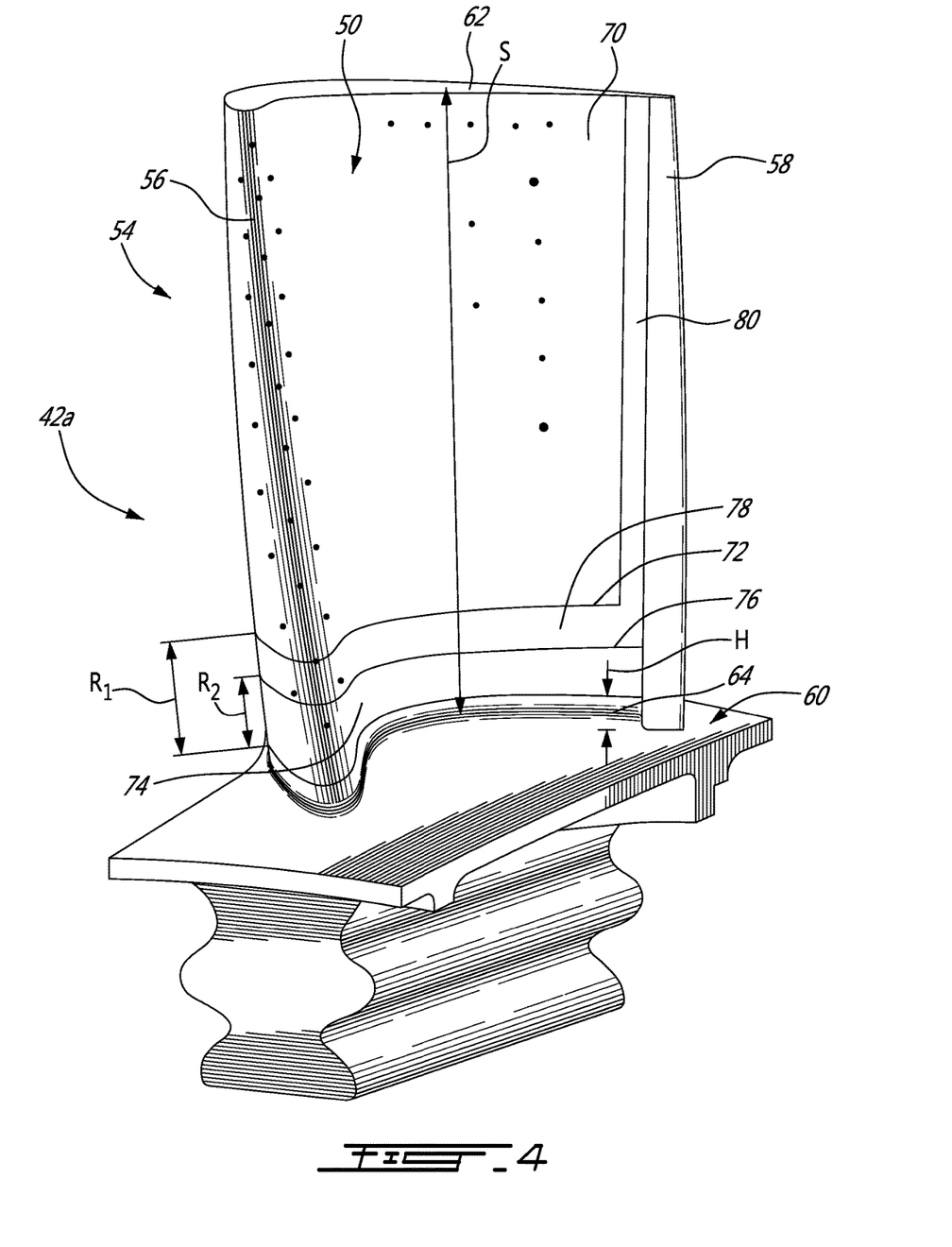
FIG. 4 is a schematic tridimensional view of a pressure side of the blade of FIG. 3, in accordance with a particular embodiment.
Figure 5:
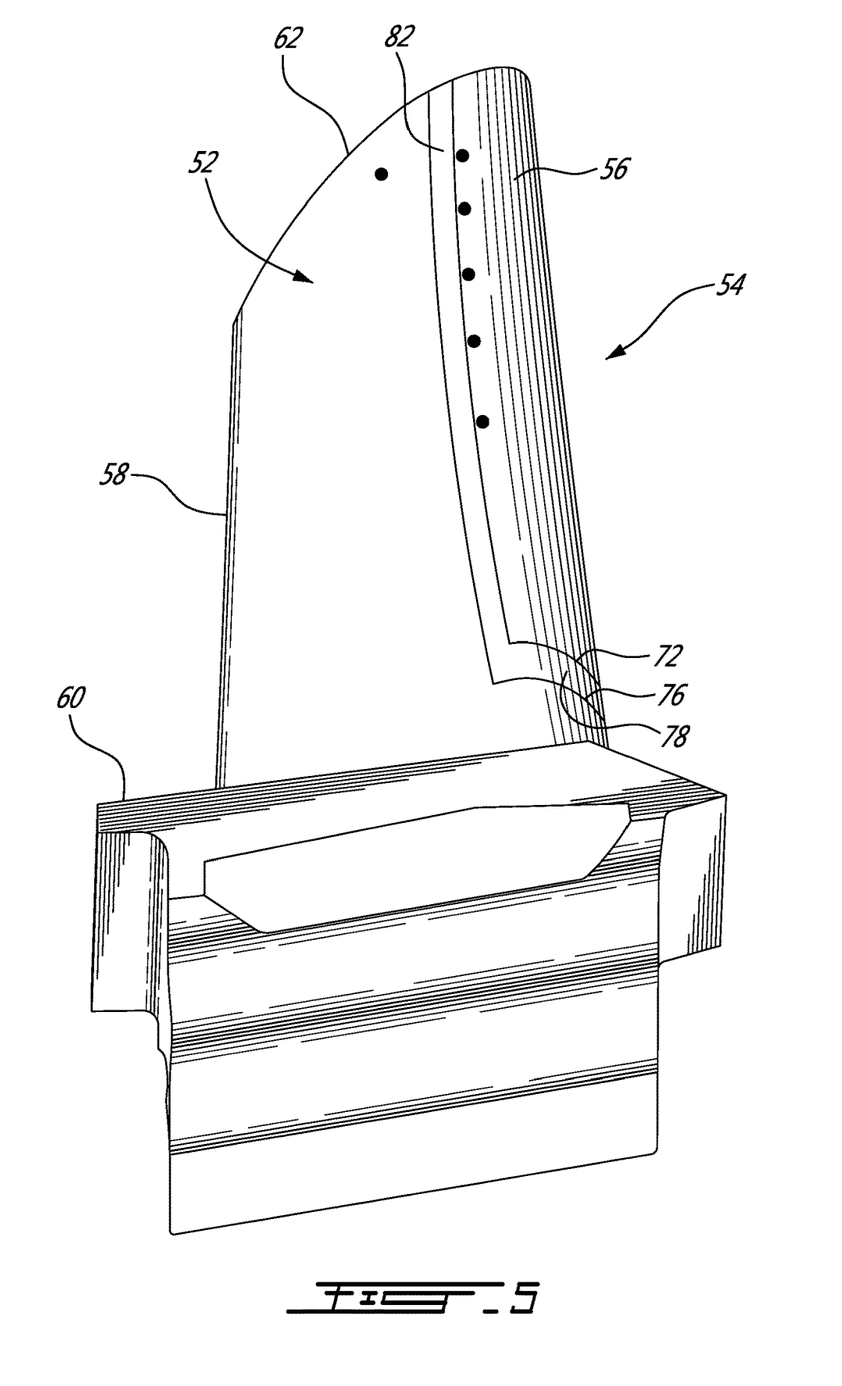
FIG. 5 is a schematic tridimensional view of a suction side of the blade of FIG. 3, in accordance with a particular embodiment.

More specifically, the rotor assemblies 36, 38 each include a plurality of circumferentially distributed blades 42a and 42b respectively which extend radially across the hot gas path 27. FIGS. 3-5 show an example of a blade 42a of the first HPT stage. It can be seen that each blade 42a has a platform section 60, and an airfoil section 54 extending from the platform section 60 to the blade tip 62. The airfoil section 54 has a leading edge 56 and an opposed trailing edge 58. Each airfoil section 54 also has a pressure side 50, shown here with a concave configuration, interconnecting the leading and trailing edges 56, 58. Each airfoil section 54 also has a suction side 52 interconnecting the leading and trailing edges 56, 58 opposite the pressure side 50. A maximum radial distance between the tip 62 and the platform section 60 defines the radial height or maximum span S of the airfoil section 54 (see FIG. 4).

In a particular embodiment and as shown in FIG. 3 the airfoil section 54 is hollow, and as such the interconnected leading edge 56, trailing edge 58, pressure side 50 and suction side 52 define a perimeter surrounding an enclosure 68. In the illustrated embodiment, a plurality of ribs 69 are shown extending across the enclosure 68 to interconnect the pressure side 50 and the suction side 52, and to separate the enclosure into adjacent cooling cavities. Although not shown, the ribs 69 may include apertures defined therethrough to allow fluid circulation within the enclosure 68. However, it is understood that the configuration of the blade 42a within the enclosure 68 may vary. In a particular embodiment, the leading edge 56, trailing edge 58, pressure side 50 and suction side 52 include a plurality of cooling holes defined therethrough which provide fluid communication between the enclosure 68 and the gas path 27, such that a cooling fluid circulated through the hollow airfoil section 54 can exit into the gas path 27 through the cooling holes.

Figure 6:
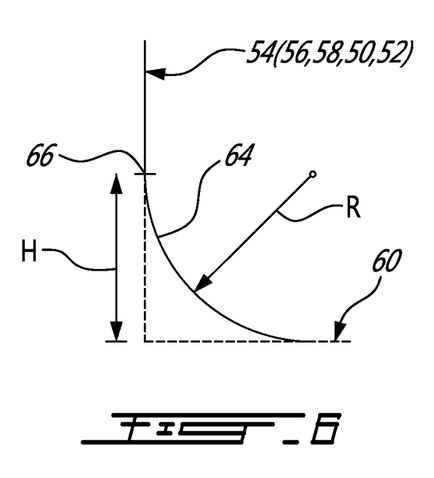
FIG. 6 is a schematic side view of part of a fillet surface of the blade of FIG. 3, in accordance with a particular embodiment.

Referring to FIGS. 4 and 6, the blade 42a further includes a rounded fillet surface 64 surrounding the airfoil section 54 and connecting the leading edge 56, trailing edge 58, pressure side 50 and suction side 52 to the platform section 60. The fillet surface 64 extends radially from an outer end 66 tangential to the airfoil section 54 to an inner end tangential to the platform section 60. In a particular embodiment, the fillet surface 64 has a semi-circular cross-sectional profile, with a constant radius R. In a particular embodiment, the radius R is about 0.050 inch. The fillet surface 64 merges with the airfoil section 54 at its outer end 66, defined at the location where the fillet surface 64 becomes tangent to the surface of the airfoil section 54. The outer end 66 extends a radial distance H from the platform section 60. In a particular embodiment, variations in the profile of the airfoil section 54 and/or the platform section 60 cause the distance H to vary from the leading edge 56 to the trailing edge 58 of the airfoil section 54. In a particular embodiment, the distance H varies from about 2% of the maximum span S at the leading edge 56 to about 5% of the maximum span S at the trailing edge 58.

Referring to FIGS. 4-5, the airfoil section 54 is partially coated with a thermal barrier coating. An example of a commonly used type of thermal barrier coating is a thermal insulating coating based on zirconia stabilized with yttria. Any other adequate type of coating material, and in a particular embodiment of ceramic material, may be used.

As can be seen in FIG. 4, a radially outermost portion 70 of the pressure side 50 and of the leading edge 56 is covered by the thermal barrier coating. This radially outermost portion 70 extends radially between an inner limit 72 and the blade tip 62. The inner limit 72 is located at a radial distance $R_1$ from the platform section 60. In a particular embodiment, the radial distance $R_1$ is 21% or less of the maximum span S.

In the embodiment shown, the coated portion of the pressure side 50 extends axially from the leading edge 56 to a location in proximity of the trailing edge 58. The radially outermost portion 70 thus extends axially across a significant portion of the pressure side 50, and radially across a significant portion of the maximum span S of the airfoil section 54 in the pressure side 50 and the leading edge 56. In a particular embodiment, this provides for optimal protection of the portions of the airfoil section 54 which are the most susceptible of damage during use in a high temperature environment.

As can also be seen in FIG. 4, the radially innermost portion 74 of the leading edge 56 and of the pressure side 50 is free or substantially free of the thermal barrier coating. The radially innermost portion 74 extends radially between the platform section 60 and an outer limit 76, which is located a radial distance $R_2$ from the platform section 60.

In the present specification, "substantially free of the thermal barrier coating" is intended to include a small thickness of coating which is less than a minimum value necessary to provide for the required adherence strength and/or thermal resistance and/or microstructure and/or other relevant characteristic, such that a coating having less than this minimal thickness is not considered to have a substantial effect on the portion receiving it. In a particular embodiment, "substantially free of the thermal barrier coating" includes an applied thickness of coating of 0.001 inch or less, and includes for example the small amount of coating material which may be deposited through overspray during application of the coating to the coated portion(s).

It has been found that ensuring that at least the fillet surface 64 is free or substantially free of the thermal barrier coating may reduce or eliminates the risks of a thermal gradient forming in this fillet surface 64 for at least some embodiments, which thermal gradients may lead to the formation of unacceptable fissures in the region of the fillet. The portion of the airfoil section 54 free or substantially free of the thermal barrier coating thus includes at least the fillet surface 64. In a particular embodiment, the radial distance $R_2$ corresponds to at least 5% of the maximum span S.

Depending on the tooling used, it may be necessary for the regions free or substantially free of coating to include a margin radially outwardly of the fillet surface 64, to ensure that the fillet surface 64 does not receive a significant amount of coating material during application. In a particular embodiment, the radial distance $R_2$ corresponds to at least 14% of the maximum span S.

In the embodiment shown, the trailing edge 58 is also free or substantially free of the thermal barrier coating. The suction side 52 (see FIG. 5) is also mostly free or substantially free of the thermal barrier coating along most of its surface, with the exception of a zone adjacent the leading edge, as will be further detailed below.

In the embodiment shown, transition zones are provided between the coated region and the regions which are free or substantially free of the thermal barrier coating, such as to avoid an abrupt step in coating thickness between adjacent regions. The transition zones have a tapering thickness of thermal barrier coating material, such as to define a transition between the absence or minimal thickness in the regions which are free or substantially free of the thermal barrier coating and the full thickness in the coated regions. For example, in a particular embodiment, the coated regions have a thickness of coating material of from 0.003 inch to 0.007 inch, and the transition zones have a thickness tapering from 0.001 inch or less to the full thickness of from 0.003 inch to 0.007 inch.

It can be seen in FIG. 4 that the limits 72, 76 of the radially outermost and radially innermost portions 70, 74 are spaced apart. An inner transition zone 78 thus extends from the limit 76 at $R_2$ to the limit 72 at $R_1$, along the leading edge 56 and along the pressure side 50. The inner transition zone 78 provides the coating thickness transition between the coated radially outermost portion 70 of the pressure side 50 and of the leading edge 56, and the radially innermost portion 74 which is free or substantially free of coating.

As can also be seen in FIG. 4, a downstream transition zone 80 extends axially on the pressure side 50 between the radially outermost portion 70 and the trailing edge 58. The downstream transition zone 80 extends radially between the inner transition zone 78 and the blade tip 62. The downstream transition zone 80 provides the coating thickness transition between the coated radially outermost portion 70 and the trailing edge 58 which is free or substantially free of coating. In a particular embodiment and with reference to FIG. 3, the downstream transition zone 80 extends axially along a distance $T_D$ of from 9% to 11% of a maximum chord length C of the airfoil section 54.

As can be seen in FIG. 5, an upstream transition zone 82 extends axially on the suction side 52 between the leading edge 56 and the major portion of the suction side 52 which is free or substantially free of the thermal barrier coating. The upstream transition zone 82 extends radially between the inner transition zone 78 and the blade tip 62. The upstream transition zone 82 provides the coating thickness transition between the coated leading edge 56 and the major portion of the suction side 52 which is free or substantially free of coating. In a particular embodiment and with reference to FIG. 3, the upstream transition zone 82 extends axially along a distance $T_U$ of from 14% to 18% of a maximum chord length C of the airfoil section 54.

In a particular embodiment, the thermal barrier is thus applied by masking at least the fillet surface 64 to define the region(s) free or substantially free of the coating, and the coating is applied at least on the radially outermost portion 70 of the pressure side 50 and leading edge 56, between the inner limit at $R_1$ and the blade tip 62. In a particular embodiment, the transition zones 78, 80, 82 are also formed during application of the coating. The coating can be applied through any suitable method, including application through spraying with the region(s) free or substantially free of the coating being protected by an obstruction extending between the source of the spray and the region(s). A plurality of blades may be relatively disposed and simultaneously coated such that this obstruction is defined in part or in entirety by the adjacent blades and/or retention members to which the blades are attached during application of the coating.

Although the exemplary blade shown is identified as the blade 42a of the first HPT stage, it is understood that the coating configuration shown and discussed can be applied to any other appropriate type of blade, including but not limited to the blades 42b of the second HPT stage.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A partially coated blade for a gas turbine engine, the blade comprising:
   a platform section;
   an airfoil section extending radially outwardly from the platform section and defining a tip of the blade,
      a maximum radial distance between the platform section and the tip defining a maximum span of the blade, the airfoil section including:
      opposed leading and trailing edges,
      a pressure side extending from the platform section to the tip and interconnecting the leading and trailing edges, and
      a suction side from the platform section to the tip and interconnecting the leading and trailing edges opposite the pressure side;
   wherein a first portion of the pressure side and of the leading edge is covered by a thermal barrier coating, the first portion extending radially between a first limit and the tip, the first limit located at a radial distance from the platform section of at most 21% of the maximum span;
   wherein a second portion of the pressure side and of the leading edge is free or substantially free of the thermal barrier coating, the second portion extending radially between the platform section and a second limit, the second limit located a radial distance from the platform section corresponding to at least 5% of the maximum span; and
   wherein the suction side includes a third portion extending axially from the trailing edge toward the leading edge, the third portion being free or substantially free of the thermal barrier coating, an upstream transition zone extending axially on the suction side between the third portion and the first portion, the upstream transition zone including a tapering thickness of the thermal barrier coating to define a transition between the third portion and the first portion, the upstream transition zone extending axially from the leading edge along a distance of from 14% to 18% of a maximum chord length of the airfoil.

2. The blade as defined in claim 1, wherein the second limit is located a radial distance from the platform section corresponding to at least 14% of the maximum span.

3. The blade as defined in claim 1, wherein an inner transition zone is defined between the first and second limits, the inner transition zone including a tapering thickness of the thermal barrier coating to define a transition between the first and second portions.

4. The blade as defined in claim 3, wherein:
   the trailing edge is free or substantially free of the thermal barrier coating; and
   a downstream transition zone extends axially on the pressure side between the first portion and the trailing edge, the downstream transition zone extending radially between the tip and the inner transition zone, the downstream transition zone including a tapering thickness of the thermal barrier coating to define a transition between the first portion and the trailing edge.

5. The blade as defined in claim 4, wherein the downstream transition zone extends axially along a distance of from 9% to 11% of a maximum chord length of the airfoil section.

6. The blade as defined in claim 3, wherein:
   the upstream transition zone extends radially between the tip and the inner transition zone.

7. The blade as defined in claim 1, wherein the second portion includes a thickness of the thermal barrier coating of 0.001 inch or less.

8. The blade as defined in claim 7, wherein the first portion includes a thickness of the thermal barrier coating of from 0.003 inch to 0.007 inch.

9. A partially coated blade for a gas turbine engine, the blade comprising:
   a platform section;
   an airfoil section extending radially outwardly from the platform section and defining a tip of the blade, the airfoil section having:
   opposed leading and trailing edges,
   a pressure side interconnecting the leading and trailing edges, and
   a suction side interconnecting the leading and trailing edges opposite the pressure side;

a rounded fillet surface surrounding the airfoil section and connecting the leading edge, trailing edge, pressure side and suction side to the platform section, the fillet surface extending radially from an outer end tangential to the airfoil section to an inner end tangential to the platform section;

wherein a radially outermost portion of the pressure side and of the leading edge is covered by a thermal barrier coating, the radially outermost portion extending radially between a first limit and the tip, the first limit located at a radial distance from the platform section of at most 21% of the maximum span;

wherein the fillet surface is free or substantially free of the thermal barrier coating; and wherein the suction side includes a portion extending axially from the trailing edge toward the leading edge, the portion of the suction side being free or substantially free of the thermal barrier coating, an upstream transition zone extending axially on the suction side between the portion of the suction side and the radially outermost portion, the upstream transition zone including a tapering thickness of the thermal barrier coating to define a transition between the portion of the suction side and the radially outermost portion, the upstream transition zone extending axially from the leading edge along a distance of from 14% to 18% of a maximum chord length of the airfoil.

10. The blade as defined in claim 9, wherein a radially innermost portion of the pressure side and of the leading edge is free or substantially free of the thermal barrier coating, the radially innermost portion extending radially between the platform section and a second limit, the second limit located a radial distance from the platform section corresponding to at least 5% of the maximum span.

11. The blade as defined in claim 10, wherein the second limit is located a radial distance from the platform section corresponding to at least 14% of the maximum span.

12. The blade as defined in claim 10, wherein an inner transition zone is defined between the first and second limits, the inner transition zone including a tapering thickness of the thermal barrier coating to define a transition between the radially innermost and radially outermost portions.

13. The blade as defined in claim 12, wherein:
the trailing edge is free or substantially free of the thermal barrier coating; and
a downstream transition zone extends axially on the pressure side between the radially outermost portion and the trailing edge, the downstream transition zone extending radially between the tip and the inner transition zone, the downstream transition zone including a tapering thickness of the thermal barrier coating to define a transition between the radially outermost portion and the trailing edge.

14. The blade as defined in claim 13, wherein:
the upstream transition zone extending radially between the tip and the inner transition zone.

15. The blade as defined in claim 9, wherein a radially innermost portion of the leading edge and of the pressure side includes a thickness of the thermal barrier coating of 0.001 inch or less.

16. The blade as defined in claim 15, wherein the radially outermost portion includes a thickness of the thermal barrier coating of from 0.003 inch to 0.007 inch.

17. A method of applying a thermal barrier coating on a blade, the method comprising:
masking at least a filler surface defining a connection between a platform section and an airfoil section of the blade, the airfoil section having a pressure side and a suction side extending chord-wise between a leading edge and a trailing edge; and
applying the thermal barrier coating on a first portion of the pressure side and of the leading edge of the blade, the first portion extending radially between a limit and a tip of the blade, the limit located at a radial distance from the platform section of at most 21% of a maximum span of the blade; wherein a second portion of the pressure side and of the leading edge is free or substantially of the thermal barrier coating, the second portion extending radially between the platform section and a second limit, the second limit located at a radial distance from the platform section corresponding to at least 5% of the maximum span; and wherein the suction side of the airfoil has a third portion extending axially from the trailing edge toward the leading edge, the third portion being free or substantially free of the thermal barrier coating, and wherein applying the thermal barrier coating further comprises applying a tapering thickness of thermal barrier coating over a transition zone extending axially on the suction side between the third portion and the first portion, the transition zone extending axially from the leading edge along a distance of from 14% to 18% of a maximum chord length of the airfoil.

18. The method as defined in claim 17, wherein the second limit is located at a radial distance from the platform section of at least 14% of the maximum span of the blade.

* * * * *